Patented Dec. 17, 1935

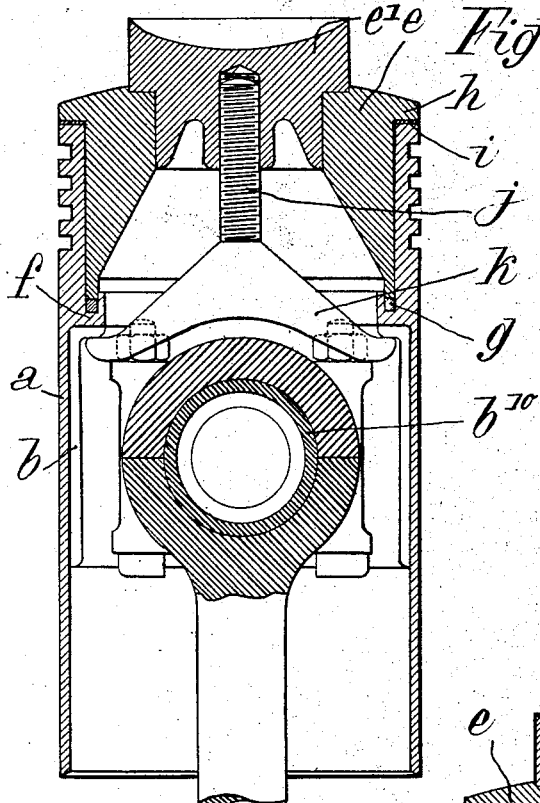
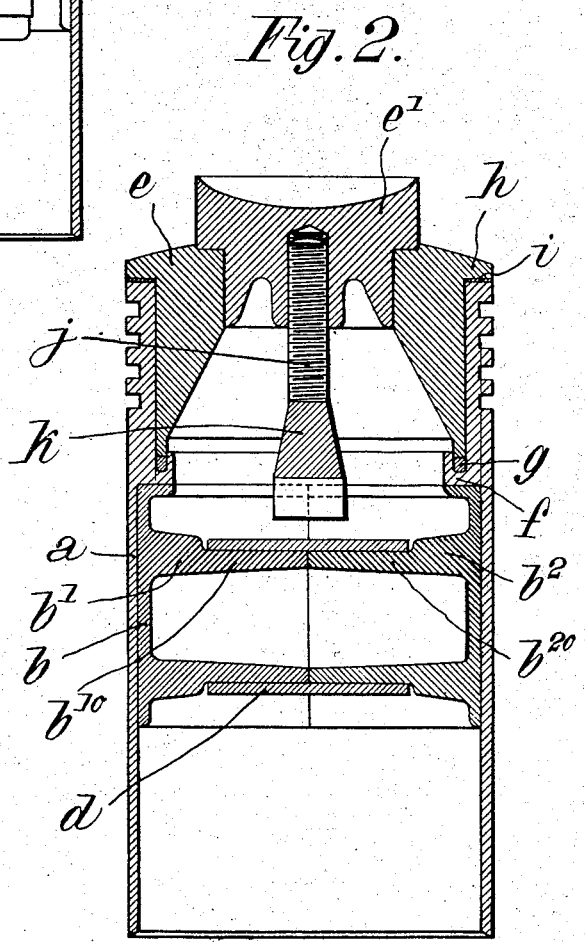

2,024,269

UNITED STATES PATENT OFFICE 2,024,269

PISTON

Auguste Louis René Bernard, Rueil-Malmaison, France; Renée Bernard (nee Bournonville) executor of said Auguste Louis René Bernard, deceased Application May 28, 1934, Serial No. 728,048
In Belgium June 20, 1933

11 Claims. (Cl. 309—15)

The present invention relates to pistons. It is more particularly concerned with pistons for internal combustion engines and especially engines of the two-stroke type, in which the pistons are subjected to very high pressures.

The object of the present invention is to provide a piston of simplified construction and of improved efficiency.

The piston according to the present invention includes a tubular element adapted to constitute at least a portion of the piston skirt, and a second element adapted to be inserted and fixed in said first mentioned element and carrying a cross piece arranged to act as a wrist pin for the connecting rod.

Other features of my invention will result from the following detailed description thereof.

A preferred embodiment of the present invention will be hereinafter described with reference to the accompanying drawing, given merely by way of example and in which:

Fig. 1 is a sectional view at right angles to the wrist pin of a piston for an internal combustion engine, according to the present invention;

Fig. 2 is an axial sectional view at right angles to Fig. 1.

In order to obtain a piston according to the present invention I provide a tubular element made of a strong metal, for instance steel, adapted to constitute at least a portion of the piston skirt. I may for instance make use of a tubular element $a$ constituting the whole of the piston skirt, as shown in the drawing.

Of course, when this tubular element $a$ constitutes an important portion of the piston skirt, it is provided with grooves adapted to receive packing rings.

A second element $b$, made of any suitable metal, for instance steel, carrying a cross piece capable of forming the wrist pin is then provided. This element $b$ is advantageously given the shape of a portion of a cylindrical tube in which is provided the cross piece above mentioned.

Anyway, this element $b$ is so devised as to be able of being inserted, in suitable position, in tubular element $a$, so as to be at least partly surrounded by said element $a$ and to be rigidly fixed therein.

To this effect, as shown in Figs. 1 and 2, elements $a$ and $b$ are so shaped that they can be forced into one another, these elements being then given corresponding surfaces of contact. These elements $a$ and $b$ may be further fixed together through any suitable means, for instance in the manner that will be hereinafter described with reference to Figs. 1 and 2.

The inside element $b$ can of course be made in any suitable manner but I have found that it is advantageous to give it the following structure:

I first make, by stamping and by means of any suitable dies, two parts $b^1$ and $b^2$ such that when they are juxtaposed to each other they form a composite piece corresponding to element $b$.

Preferably, these parts $b^1$ and $b^2$ are made of such a shape that each of them constitutes substantially one half of element $b$ cut along a diametrical plane at right angles to the axis of the wrist pin to be carried by element $b$.

At least one of these parts $b^1$ and $b^2$ is provided with a projection capable of forming at least a portion of the wrist pin, or preferably acting as a support for a sleeve which constitutes said wrist pin.

For instance, as shown in Figs. 1 and 2, each of these parts $b^1$ and $b^2$ is provided with a hollow projection $b^{10}$, $b^{20}$ respectively. These projections are preferably made of identical shapes and so arranged that when parts $b^1$, $b^2$ are juxtaposed to each other, projections $b^{10}$, $b^{20}$ are disposed in line with each other, preferably abutting against each other so as to form a cross piece on which can be slipped, before juxtaposition of said parts, a sleeve $d$ adapted to form the wrist pin.

The parts $b^1$ and $b^2$ are then assembled together, either by electrical welding, or, preferably, forcing the various parts into one another. For instance projections $b^{10}$, $b^{20}$ are forced into tube $d$, eventually after assembling the connecting rod with the wrist pin.

However, when said end portion of the piston should preferably be added to the piston skirt, and especially when it must include a central element $e^1$ made of a metal adapted to resist high temperatures, I make it as will be hereinafter described with reference to the drawing, it being assumed that tubular element $a$ constitutes at least the upper portion of the lateral walls of the piston.

The upper portion of tubular element $a$ is provided with an axial hole extending down to the level of an annular shoulder $f$ provided in said element, this shoulder being for instance located at a distance from the upper face of the piston equal to the radius of said piston.

I provide an end piece $e$, advantageously made of a light metal such as aluminium, adapted to fit in said hole, preferably with a clearance which is too small for permitting the free dilatation of said end piece in order to ensure a good contact between the inner walls of said hole and the outer walls of end piece e, and therefore a satisfactory transmission of heat through the surfaces of contact.

I may even, advantageously, coat said surfaces of contact with a layer of a metal that is a good conductor of heat, such for instance as copper or even silver.

The inner face of said end piece e may, for instance, be given an ogival shape, so that its thickness in the longitudinal direction increases from the center toward the periphery, in order to facilitate the flow of heat.

A suitable packing element g is provided between the bottom of end piece e and shoulder f.

Another packing means is provided between a flange h extending at the periphery of the upper part of end piece e and the upper edge of tubular element a. Said packing means may for instance consist, as shown in the drawing, of an annular element i, made for instance of copper.

Finally, end piece e is secured to the piston through any suitable means, for instance as it will be hereinafter described.

In the embodiment shown in the drawing, I make use of a single rod j connected, on the one hand, at its upper end, to the end piece of the piston, preferably in the central part thereof, and on the other hand, at its lower end through a transverse element k engages beneath suitable portions of tubular element a (said portions consisting, in the example shown, of the annular projection f above mentioned, which is carried by the inner wall of tubular element a).

This means of fixing the end piece to the piston is particularly advantageous when the end piece of the piston includes, in its central part, an element $e^1$ distinct from said end piece e.

Rod j can then be utilized for keeping element $e^1$ applied against end piece e.

In this case, as shown by the drawing, end piece e is provided with an axial hole adapted to accommodate a corresponding portion of element $e^1$. This element $e^1$, thus inserted in said hole, is provided with a screw threaded blind hole adapted to receive the free end of rod j.

Element $e^1$ is then screwed on the screw threaded upper end of rod j after end piece e has been inserted in position in tubular element a and the base of element $e^1$ has been fitted in the central hole of end piece e. Rod j and its transverse part k have, for instance been previously inserted in proper position through the upper orifice of tubular element a before the end piece e of the piston was inserted in the upper part of said tubular element a.

With such an arrangement, the flow of heat received by element $e^1$ will readily take place through the mass of end piece e, made of a metal which is a good conductor of heat and then through the large surfaces of contact provided between end piece e and tubular element a.

Whatever be the means for fixing end piece e to the remainder of the piston, said means can also serve to fix element b in position, especially when said element has been secured to tubular element a by being forced therein.

In the latter case, element b is so devised that its upper edge may bear against the lower edge of the annular projection f of tubular element a. This upper edge of element b is provided with an inwardly extending annular flange m under which, once element b has been fitted in position, the ends of the transverse part k of rod j can be applied.

It will readily be understood that, by screwing element $e^1$ on the upper end of rod j, element $e^1$, end piece e, tubular element a and element b will be securely assembled together.

The advantages of the piston according to the present invention, a specific embodiment of which has been above described, are the considerable strength of the wrist pin thereof and the large surface of contact between the connecting rod and said pin, so that this piston will be particularly well adapted to resist the very high pressures that are developed in some internal combustion engines.

While I have, in the above description, disclosed what I deem to be a practical and efficient embodiment of my invention, it should be well understood that I do not wish to be limited thereto as there might be changes made in the arrangement, disposition and form of the parts without departing from the principle of my invention as comprehended within the scope of the appended claims.

What I claim is:

1. A piston especially for use in an internal combustion engine, which comprises in combination, a tubular element forming at least a portion of the piston skirt, a composite element, means to secure said composite element inside said tubular element, said composite element having lateral walls and being made of two parts the peripheral portions of each of said parts constituting about one half of the lateral walls of said composite element, said parts being joined along an axial plane of the piston, radial projections carried by said parts respectively, and functionally integral therewith, said projections being in line with each other when said parts are assembled together, and a sleeve surrounding both of said projections and forming the wrist pin of the piston.

2. A piston, especially for use in an internal combustion engine, comprising in combination a tubular element forming at least a portion of the piston skirt, a second element, a cross-piece carried by said second element and forming the wrist pin of the piston, an end piece forming the upper face of said piston and means for securing both said end piece and said second element to said first element, said end piece including a peripheral portion bearing upon said tubular element, and a central portion tightly fitting in said peripheral portion, said central portion having a hole and screw threads in said hole, said securing means comprising a rod threadedly engaging in said hole and means at the other end of said rod for securing the same to said second element.

3. A piston, especially for use in an internal combustion engine, comprising in combination a tubular element forming at least a portion of the piston skirt, a second element, projections extending inwardly from said second element, a cross-piece carried by said second element and forming the wrist pin of the piston, an end piece forming the upper face of said piston and means for securing both said end piece and said second element to said first element, said end piece including a peripheral portion bearing upon said tubular element, and a central portion tightly fitting in said peripheral portion, said central portion having a hole and screw threads in said hole, said securing means comprising a rod threadedly engaging in said hole and flanged portions at the other end of said rod, said flanged portions engaging with said projections on said second element.

4. A piston, especially for use in an internal combustion engine, comprising in combination a tubular element forming at least a portion of the piston skirt, a composite element, means to secure said composite element inside said tubular element, said composite element having lateral walls and being made of two parts each of which corresponds to a portion of the lateral walls of said composite element, radial projections extending from said parts and being integral therewith, said projections being in line with each other when said parts are assembled together and a sleeve surrounding both of said projections and forming the wrist pin of said piston, an end piece forming the upper face of said piston and means for securing said end piece and said composite element to said tubular element.

5. A piston, especially for use in an internal combustion engine, comprising in combination a tubular element forming at least a portion of the piston skirt, a composite element, means to secure said composite element inside said tubular element, said composite element having lateral walls and being made of two parts each of which corresponds to a portion of the lateral walls of said composite element, radial projections extending from said parts and being integral therewith, said projections being in line with each other and having their faces in contact with one another when said parts are assembled together and a sleeve surrounding both of said projections and forming the wrist pin of said piston, an end piece forming the upper face of said piston and means for securing said end piece and said composite element to said tubular element.

6. A piston, especially for use in an internal combustion engine, comprising in combination a tubular element forming at least a portion of the piston skirt, a composite element, means to secure said composite element inside said tubular element, said composite element having lateral walls and consisting of two substantially identical parts, said parts being joined along an axial plane of the piston, radial projections extending from said parts and being integral therewith, said projections being in line with each other and having their faces in contact with one another when said parts are assembled so as to form the wrist pin of said piston, an end piece forming the upper face of said piston and means for securing said end piece and said composite element to said tubular element.

7. A piston, especially for use in an internal combustion engine, comprising in combination a tubular element forming at least a portion of the piston skirt, a composite element, means to secure said composite element inside said tubular element, said composite element having lateral walls and being made of two substantially identical parts, said parts being joined along an axial plane of the piston, radial projections extending from said parts and being integral therewith, said projections being in line with each other and having their faces in contact with one another when said parts are assembled so as to form the wrist pin of said piston, an end piece forming the upper face of said piston and means for securing said end piece and said composite element to said tubular element, said end piece including a peripheral portion bearing upon said tubular element and a central portion tightly fitting in said peripheral portion, said central portion having a hole and screw threads in said hole, said securing means comprising a rod threadedly engaging in said hole and means at the other end of said rod for securing the same to said composite element.

8. A piston, especially for use in an internal combustion engine, comprising in combination a tubular element forming at least a portion of the piston skirt, a composite element, means to secure said composite element inside said tubular element, said composite element having lateral walls and being made of two substantially identical parts, said parts being joined along an axial plane of the piston, radial projections extending from said parts and being integral therewith, said projections being in line with each other and having their faces in contact with one another when said parts are assembled so as to form the wrist pin of said piston, an end piece forming the upper face of said piston and means for securing said end piece and said composite element to said tubular element, said end piece including a peripheral portion bearing upon said tubular element and a central portion tightly fitting in said peripheral portion, said central portion having a hole and screw threads in said hole, said securing means comprising a rod threadedly engaging in said hole and flanged portions at the other end of said rod, inwardly directed flanges on said identical parts, said flanged portions engaging with said flanges to secure said end piece, said peripheral portion and said identical parts to said tubular element.

9. A piston, especially for use in an internal combustion engine, comprising in combination a tubular element forming at least a portion of the piston skirt, a composite element, means to secure said composite element inside said tubular element, said composite element having lateral walls and being made of two substantially identical parts, said parts being joined along an axial plane of the piston, radial projections extending from said parts and being integral therewith, said projections being in line with each other and having their faces in contact with one another when said parts are assembled, a sleeve surrounding both of said projections and forming the wrist pin of said piston, an end piece forming the upper face of said piston and means for securing said end piece and said composite element to said tubular element, said end piece including a peripheral portion bearing upon said tubular element and a central portion tightly fitting in said peripheral portion, said central portion having a hole and screw threads in said hole, said securing means comprising a rod threadedly engaging in said hole and flanged portions at the other end of said rod, inwardly directed flanges on said identical parts, said flanged portions engaging with said flanges to secure said end piece, said peripheral portion and said identical parts to said tubular element.

10. A piston especially for use in an internal combustion engine, which comprises in combination, a tubular element forming at least a portion of the piston skirt, a composite element, means to secure said composite element inside said tubular element, said composite element having lateral walls and being made of two parts, the peripheral portions of each of said parts constituting a portion of the lateral walls of said composite element, radial projections carried by said parts respectively and functionally integral therewith, said projections being in line with each other when said parts are assembled together, and a sleeve surrounding both of said projections and forming the wrist pin of the piston.

11. A piston especially for use in an internal combustion engine, which comprises in combination, a tubular element forming at least a portion of the piston skirt, a composite element, means to secure said composite element inside said tubular element, said composite element having lateral walls and being made of two parts, the peripheral portions of each of said parts constituting a portion of the lateral walls of said composite element, radial projections carried by said parts respectively and functionally integral therewith, said projections being in line with each other and having their faces in contact with one another when said parts are assembled together, and a sleeve surrounding both of said projections and forming the wrist pin of the piston.

AUGUSTE LOUIS RENÉ BERNARD.